US011156143B2

(12) United States Patent
Robel et al.

(10) Patent No.: US 11,156,143 B2
(45) Date of Patent: Oct. 26, 2021

(54) AFTERTREATMENT SYSTEM AND METHOD

(71) Applicant: Caterpillar Inc., Peoria, IL (US)

(72) Inventors: Wade J. Robel, Dunlap, IL (US); Matthew T. Wolk, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/665,727

(22) Filed: Oct. 28, 2019

(65) Prior Publication Data
US 2021/0123366 A1 Apr. 29, 2021

(51) Int. Cl.
| | | |
|---|---|---|
| F01N 3/20 | (2006.01) | |
| F01N 3/035 | (2006.01) | |
| F01N 11/00 | (2006.01) | |
| F01N 3/10 | (2006.01) | |
| F01N 3/08 | (2006.01) | |

(52) U.S. Cl.
CPC ............. *F01N 3/208* (2013.01); *F01N 3/035* (2013.01); *F01N 3/0814* (2013.01); *F01N 3/0885* (2013.01); *F01N 3/108* (2013.01); *F01N 11/002* (2013.01); *F01N 3/0842* (2013.01); *F01N 2610/02* (2013.01); *F01N 2610/1406* (2013.01); *F01N 2610/146* (2013.01); *F01N 2900/1602* (2013.01)

(58) Field of Classification Search
CPC combination set(s) only.
See application file for complete search history.

(56) References Cited

U.S. PATENT DOCUMENTS

| | | | |
|---|---|---|---|
| 7,264,785 B2 | 9/2007 | Blakeman et al. | |
| 9,132,386 B2 * | 9/2015 | Udd | F01N 3/035 |
| 9,879,581 B2 | 1/2018 | Rodman et al. | |
| 10,207,223 B2 * | 2/2019 | Makino | F01N 3/2066 |
| 10,273,852 B2 | 4/2019 | Nilsson et al. | |
| 10,399,036 B2 * | 9/2019 | Gabrielsson | B01D 53/9472 |
| 2007/0012032 A1 * | 1/2007 | Hu | F01N 3/0842 |
| | | | 60/286 |
| 2009/0035195 A1 * | 2/2009 | Robel | F01N 13/011 |
| | | | 422/177 |
| 2013/0232958 A1 * | 9/2013 | Ancimer | B01D 53/9418 |
| | | | 60/301 |

(Continued)

OTHER PUBLICATIONS

ERC 2019 Symposium: Technologies to Meet Ultra-Low NOx Standards, Jun. 5-6, 2019, University of Wisconsin, slides from public presentation, 3 pp.

*Primary Examiner* — Binh Q Tran
(74) *Attorney, Agent, or Firm* — Leydig, Volt & Mayer, Ltd.

(57) ABSTRACT

An aftertreatment system for treating exhaust gases from an internal combustion engine includes, in series, a diesel oxidation catalyst (DOC), a diesel particular filter (DPF) downstream the DOC, and a primary selective catalyst reduction (SCR) catalyst downstream the DPF. A supplemental SCR catalyst is disposed upstream the DOC, DPF, and primary SCR catalyst to receive raw exhaust gases from the internal combustion engine. The supplemental SCR catalyst may conduct an SCR reaction on the raw exhaust gases until the supplemental SCR catalyst reaches a reaction temperature, at which time the supplemental SCR catalyst may conduct the SCR reaction.

20 Claims, 5 Drawing Sheets

(56) References Cited

U.S. PATENT DOCUMENTS

| | | | |
|---|---|---|---|
| 2014/0363358 A1* | 12/2014 | Udd | B01D 53/9431 |
| | | | 423/212 |
| 2016/0346733 A1 | 12/2016 | Gabrielsson | |
| 2018/0080359 A1* | 3/2018 | Price | B01J 23/42 |
| 2018/0280877 A1 | 10/2018 | Chen et al. | |
| 2018/0345218 A1 | 12/2018 | Goffe | |
| 2019/0383192 A1* | 12/2019 | Dou | F01N 13/0093 |

* cited by examiner

AFTERTREATMENT SYSTEM AND METHOD

TECHNICAL FIELD

This patent disclosure relates generally to an exhaust aftertreatment system for treating exhaust gases from an internal combustion engine and, more particularly, to a system and method of utilizing selective catalytic reduction.

BACKGROUND

Various systems and methods have bene developed to reduce certain emissions and byproducts in the exhaust gases discharged from internal combustion engines, some of which have been directly developed in response to government-mandated regulations over such emissions. These systems may work in in situ with the combustion process, such as fuel additives and the like. Other systems may be disposed downstream in the exhaust system to interact with the exhaust gasses and are may be referred as aftertreatment systems. One example of an aftertreatment system is a filtration system like a diesel particulate filter (DPF) that filters and remove elements from the exhaust gases such as particulate matter and soot that may occur due to, for example, incomplete combustion of fuel. Because the filter physically traps and accumulates particulate matter, it will eventually start to impede exhaust flow, and therefore typically requires periodic cleaning, which may be accomplished by a process referred to as "filter regeneration." Filter regeneration may be either active or passive. Active regeneration is usually accomplished using a supplemental source of heat, such as by introducing and combusting additional fuel in the exhaust system to burn off the particulate matter trapped by the filter. Passive regeneration occurs under normal exhaust temperatures and does not require a supplemental heat source. However, passive generation typically requires that the filter be coated with special catalytic materials to initiate the chemical conversions that occur during passive regeneration, or that special catalytic coatings be provided upstream of the filter to cause the associated chemical reactions for passible regeneration.

Other examples of an aftertreatment system are those that use a catalyst disposed in the exhaust stream to directly convert the exhaust gases to more benign chemicals. For example, in a chemical process referred to selective catalytic reduction (SCR), a catalyst with a flow-through substrate made from or coated with a base metal such as vanadium receives the hot exhaust gases discharged from the internal combustion engine. A gaseous or liquid reductant agent is introduced to the exhaust system and can intermix the exhaust gases or can be absorbed onto the catalyst. A common reductant agent, or diesel exhaust fluid (DEF), is urea, although other suitable substances such as ammonia may be used in an SCR process. Nitrogen oxides such as NO and $NO_2$, sometimes referred to as $NO_X$, react with the DEF in the presence of the catalyst such that $NO_X$ is converted to nitrogen ($N_2$) and water ($H_2O$). Another example of a catalytic aftertreatment system is a diesel oxidation catalyst (DOC) in which a catalyst made from palladium, platinum or other noble metal catalytically oxidizes with carbon monoxide (CO) and hydrocarbons ($C_XH_X$) in the exhaust gasses to form carbon dioxide ($CO_2$) and water ($H_2O$).

In instances where the internal combustion engine is of a significant size, e.g., in the magnitude of several hundred horsepower or kilowatts, the engine may be operatively associated with multiple aftertreatment systems intended to interact with different emissions and byproducts in the exhaust gases. It will be appreciated, however, that combining several different aftertreatment systems together presents packaging challenges and concerns over size, weight and cost. U.S. Pat. No. 9,879,581 ("the '581 patent") describes an aftertreatment system including a diesel oxidation catalyst, a diesel particulate filter, and a selective catalytic reduction catalyst in arranged in cooperative operation together. The present application is also directed to novel arrangement and methods for the aftertreatment of engine exhaust gases.

SUMMARY

The disclosure describes, in an aspect, an aftertreatment system for treating exhaust gases from an internal combustion engine. The aftertreatment system includes a diesel oxidation catalyst (DOC) to oxidize carbon monoxide (CO) and hydrocarbons ($C_XH_X$) in the exhaust gases to carbon dioxide ($CO_2$) and water ($H_2O$). The aftertreatment system also includes a diesel particulate filter (DPF) disposed downstream of the DOC to receive exhaust gases and operatively configured to trap particulate matter from the exhaust gases. Included downstream of the DPF is a primary selective catalytic reduction (SCR) catalyst to reduce nitrogen oxides ($NO_X$) to nitrogen ($N_2$) and water ($H_2O$). A supplemental SCR catalyst can be disposed upstream of and close-coupled to the DOC to receive raw exhaust gases and can reduce nitrogen oxides ($NO_X$) to nitrogen ($N_2$) and water ($H_2O$) when the primary SCR catalyst is not operating.

In another aspect, the disclosure describes a method of treating exhaust gases from an internal combustion engine. According to the method, raw exhaust gases are received at a supplemental selective catalytic reduction (SCR) catalyst and reacted with diesel exhaust fluid (DEF) to reduce nitrogen oxides ($NO_X$) to nitrogen ($N_2$) and water ($H_2O$) during an startup mode of the internal combustion engine. Thereafter, the exhaust gasses are directed from the supplemental SCR catalyst to a diesel oxidation catalyst (DOC) and to a diesel particulate filter (DPF) downstream of the supplemental SCR catalyst. A primary SCR catalyst can receive the exhaust gases from the DOC and DPF, as mixed with DEF, to reduce $NO_X$ to $N_2$ and $H_2O$ during a running mode of the internal combustion engine.

In yet another aspect, the disclosure describes a compact module for after treatment of exhaust gases from an internal combustion engine. The compact module includes an upstream module housing accommodating a supplemental selective catalytic reduction (SCR) catalyst and a diesel oxidation catalyst DOC in a close-coupled relation. The supplemental SCR catalyst is located proximate an inlet opening of the upstream module housing to receive raw exhaust gases with the DOC downstream of the supplemental SCR catalyst. The compact module also includes a downstream module housing accommodating a diesel particulate filter (DPF) and a primary SCR catalyst. The DPF is located proximate an inlet opening of the downstream module housing and the primary SCR catalyst is located downstream of the DPF. A transfer conduit established fluid communication between the upstream module housing and the downstream module housing and is in fluid communication with a primary diesel exhaust fluid (DEF) injector to introduce DEF to exhaust gases passing from the upstream module housing to the downstream module housing.

DETAILED DESCRIPTION

Figure 1:
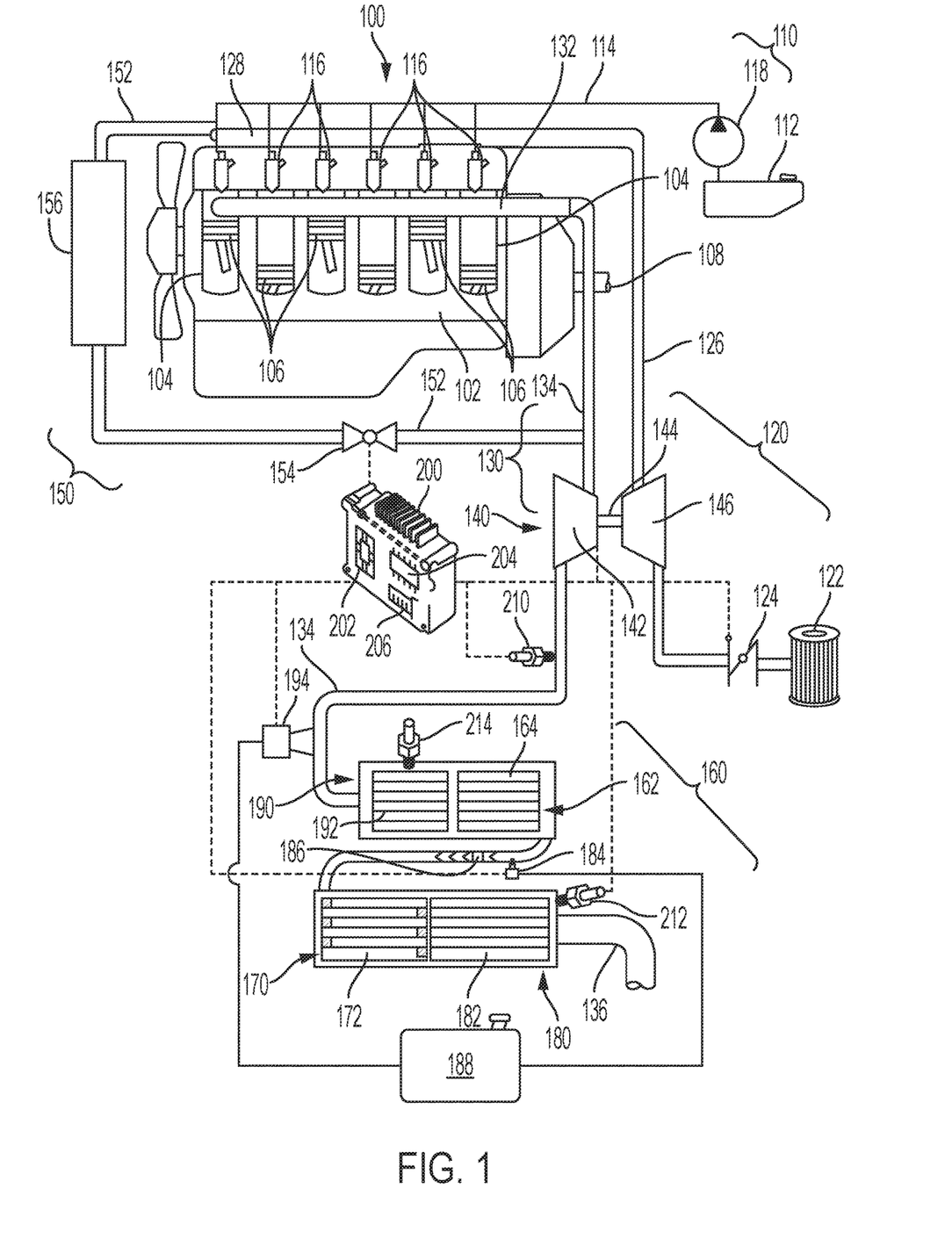
FIG. 1 is a block diagram of an internal combustion engine operatively associated with an aftertreatment system for the treatment of exhaust gases in accordance with the disclosure.

Now referring to the drawings, wherein like elements refer to like reference numbers, there is illustrated an internal combustion engine 100 in association with a plurality of engine systems to support operation. The internal combustion engine 100 is configured to combust a mixture of an oxidizer such as air and hydrocarbon-based fuel to convert the chemical energy therein to a motive mechanical power in the form of rotational motion that can be harnessed for other work. The internal combustion engine 100 may be any size, but the present application is particularly suited to large-scale heavy industrial engines on the magnitude of several hundred horsepower or kilowatts. The internal combustion engine 100 may be used to power a variety of industrial machines including mobile machines used in construction, mining, agriculture, and other industries. Such mobile machines may include dozers, excavators, wheel-loaders, dump trucks, tractors, combine harvesters, and the like. Alternatively, the internal combustion engine 100 may be used in stationary applications to power electrical generators, pumps, and the like.

The internal combustion engine 100 can be configured to combustion any suitable hydrocarbon-based fuel and may be a compression ignition diesel engine, a spark-ignited gasoline engine, a hybrid engine, a dual fuel engine burning liquid fuel and natural gas, or the engine may be a fuel-combusting turbine, steam boiler, or other type of combustion engine. However, aspects of the disclosure may be particularly suited to diesel-burning compression ignition engines. The internal combustion engine 100 can include an engine block 102 having a plurality of cylinders disposed therein in which the combustion of fuel and air occurs. Reciprocally disposed in each cylinder 104 is piston 106 that is movable between a top dead center (TDC) position and a bottom dead center (BDC) position. The pistons 106 are operatively linked to a crankshaft 108 that translates the linear reciprocal motion of the pistons 106 to rotational motion that can be transmitted to other applications. The internal combustion engine 100 may operate on the familiar four-stroke combustion cycle in which the pistons 106 sequential move to the BDC position during an intake stroke to draw in air; move to the TDC position to compresses the air; move back to the BDC position during the power stroke when fuel introduced to the cylinder 104 combusts with the air; and moves back to the TDC position to exhaust the combustion byproducts from the cylinder 104. However, the internal combustion engine 100 may be configured to operate on other combustion cycles.

To deliver fuel to the plurality of cylinders 104, the internal combustion engine 100 can be operatively associated with a fuel system 110. To store the hydrocarbon-based fuel for combustion, the fuel system 110 includes a fuel reservoir or fuel tank 112 typically located on the machine associated with the internal combustion engine 100. Fuel lines 114 may direct fuel from the fuel tank 112 to a plurality of fuel injectors 116, where at least one fuel injector 116 is in fluid communication with a respective one of the cylinders 104. The fuel system 110 may also include a fuel pump 118 that pressurizes the fuel and directs it to the plurality of fuel injectors 116 via a common fuel rail. In diesel-burning compression ignition engines, the fuel auto-ignites upon introduction to the highly pressurized conditions in the cylinder 104 resulting from the compression stroke, and accordingly, the fuel injectors 116 may be timed to increase efficiency and power generation.

To deliver air for use as an oxidizer during the combustion process from the surrounding environment, which may be the atmosphere, the internal combustion engine 100 can be operatively associated with an air intake system 120. To receive air from the environment, the air intake system 120 can include an air filter 122 and an adjustable governor 124. The air filter 122 may remove contaminants, dust, and debris from the intake air and the adjustable governor 124 may be a valve such as a butterfly valve or the like that be controlled to adjust and meter the amount of intake air introduced to the air intake system 120. An intake conduit 126, such as a pipe or a channel, extends from the adjustable governor 124 to an intake manifold 128 operatively disposed on the cylinder block 102. The intake manifold 128 can include channels or paths for directing air from the intake conduit 126 to the plurality of cylinders 104. To selectively establish fluid communication between the intake manifold 128 and the cylinder 104, the cylinders 104 may be associated with intake valves that can be selectively opened and closed at the desired times to receive intake air from the intake manifold 128. The intake valves may be electrically actuated or cam operated, and may be configured to implement variable valve timing.

To remove the byproducts of the combustion process from the cylinders 104, the internal combustion engine 100 can be operatively associated with an exhaust system 130. The exhaust system can include an exhaust manifold 132 that is operatively disposed on the cylinder block 102 and in fluid communication with the plurality of cylinders 104 via selectively actuated exhaust valves. Opening an exhaust valve as the piston 106 moves to the TDC position during the exhaust stroke forcibly discharges the contents of the cylinder 104 into the exhaust manifold 132. In an embodiment, multiple intake and exhaust valves may be associated with each cylinder 104. The exhaust manifold 132 also communicates with an exhaust conduit 134 that extends and ultimately directs the discharged exhaust gases to a stack 136 where they are discharged to the atmosphere.

In an embodiment, to increase the efficiency of the internal combustion engine 100, a turbocharger 140 can be operatively associated with the intake system 120 and the exhaust system 130. In particular, the turbocharger 140 can include a turbine 142 that is disposed in the exhaust conduit 134 downstream of the exhaust manifold 132 that receives pressurized exhaust gases discharged from the cylinders 104. The turbine 142 can include a plurality of vanes that are arranged on and disposed about a rotating hub 144. When the pressurized exhaust gases are directed through the turbine 142 past the vanes, the pressurized flow may drive the vanes thereby rotating the rotating hub 144 The hub 144 may be rotatably coupled to a compressor 146 disposed in the intake conduit 126 downstream of the governor 124 through which the atmospheric air is received. The compressor 146 can have a similar arrangement of vanes on the rotating hub 144 that functions as a blower to transfer and pressurizes intake air further downstream in the intake conduit 126 and into the intake manifold 128. Because the intake air in the intake manifold 128 is pressurized, more intake air can be forced into the cylinders 104 and thus more fuel can be introduced and combusted per engine cycle, thereby increasing engine efficiency and/or power output.

In an embodiment, to reduce emissions and particularly nitrogen oxides ($NO_X$) in the exhaust gases, the internal combustion engine 100 can be operatively configured with an exhaust gas recirculation (EGR) system 150 to redirect a portion of the exhaust gases from the exhaust system 130 to the intake system 120. In particular, the EGR system 150 can include an EGR conduit 152 that is in fluid communication with the exhaust conduit 134 upstream of the turbocharger 140 and can be selectively opened and closed by an EGR valve 154. The EGR conduit 152 is also in fluid communication with the intake manifold 128 through an EGR cooler 156 that can be a radiated air-cooled device. When the EGR valve 154 is opened, a portion of the exhaust gases are redirected through the EGR conduit to the EGR cooler 156 where the gas temperature is lowered, then directed to the intake manifold 128 where the gases are reintroduced to the cylinder 104 with fresh intake air from the intake system 120. Recirculating exhaust gases from earlier engine cycles at appropriate times during engine operation may lower combustion temperatures, which reduces $NO_X$ formation and may displace excess oxygen $O_2$ in the fresh intake air which further reduces $NO_X$ formation.

To further address and reduce emissions in the exhaust gases, the internal combustion engine 100 can be operatively associated with an aftertreatment system 160 including one or more aftertreatment devices disposed in the exhaust conduit 134 downstream of the engine. The aftertreatment devices can be arranged and communicate with each other in a manner to cooperatively interact and react with the exhaust gases to facilitate emissions reduction. For example, to reduce carbon monoxide (CO) and hydrocarbons ($C_XH_X$) resulting from unburned fuel in the exhaust gases, a diesel oxidation catalyst DOC 162 can be included to initiate an oxidation reaction converting those components to carbon dioxide ($CO_2$) and water ($H_2O$). The DOC can include a honeycombed or wire mesh DOC substrate 164 of a flow-through configuration having parallel, unobstructed channels disposed through it that presents relatively minor resistance to exhaust flow. The DOC substrate 164 may be made of a precious metal like palladium or platinum formulated to cause the catalytic reaction. A secondary reaction associated with DOCs is the production of nitrogen dioxide ($NO_2$) from nitrogen oxide (NO) and oxygen (O2) in the exhaust gases that requires further treatment.

Figure 2:
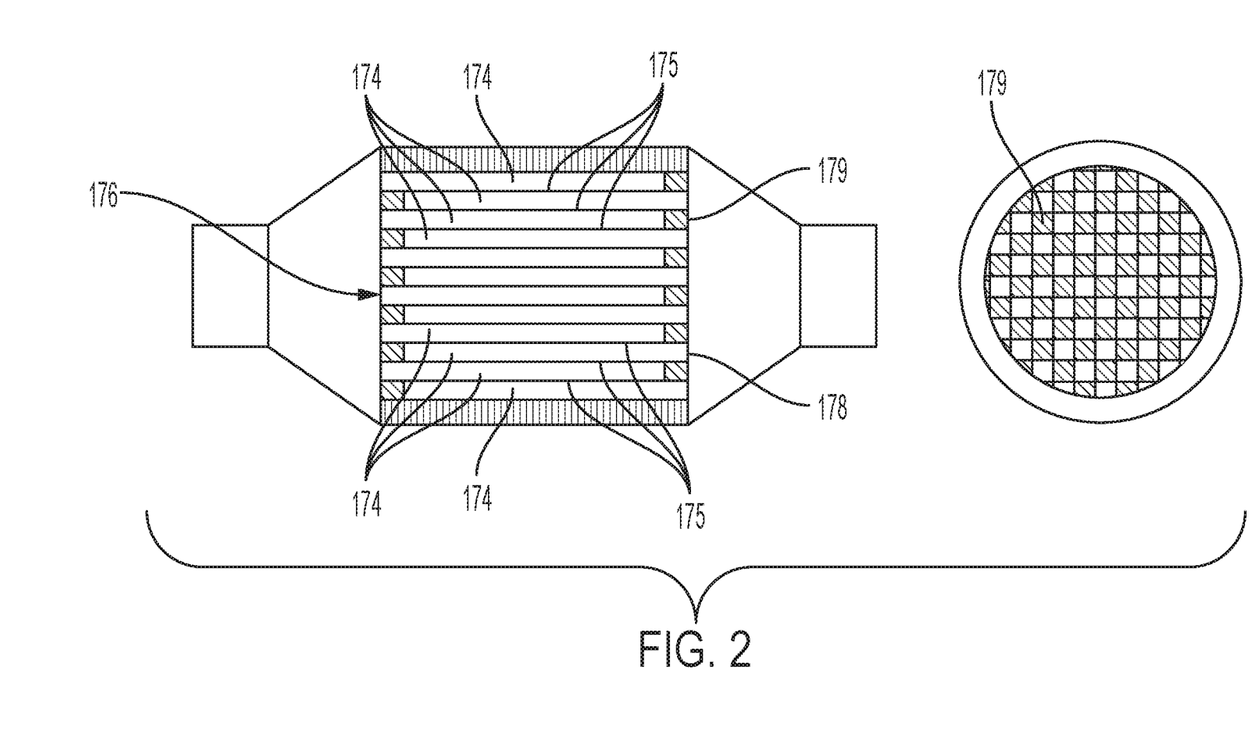
FIG. 2 is a schematic representation illustrating exhaust gas flow in a wall-flow configuration for the diesel particulate filter.

To remove particulate matter and soot, a diesel particulate filter (DPF) 170 may be included downstream of the DOC and that may include a DPF substrate 172 made of cordierite, aluminum titanate, or a similar ceramic material to trap and retain the particulate matter. In contrast to the flow-through configuration of the DOC 162, the DPF 170 may be a monolithic, wall-flow construction having inlet and outlet channels. Referring to FIG. 2, the wall-flow configuration, the DPF substrate 172 includes a plurality of small, parallel channels 174 that axially extend from the entrance face 176 to the exit face 178 of the DPF substrate 172. The channels 174 are surrounded and separated by the filter media forming internal channel walls 175 and adjacent channels are alternatingly plugged at the entrance or exit faces 176, 178 with plugs 179, such that exhaust gases, pressurized due to the exhaust stroke, are forced to traverse the internal channel walls 175 to an open channel. The wall-flow configuration of the DPF 170 can therefore trap a larger quantity or percentage of particulate matter than a flow-through configuration. However, as stated above, the DPF will require periodic regeneration.

In an embodiment, the DPF 170 may be a bare DPF, meaning that the DPF substrates 172 is in an un-catalyzed state and is free of any catalysts. No precious metals, base metals or other catalysts are coated to the DPF substrate 172, which may consist of just cordierite. As explained below, the bare DPF may still be passively regenerated in the presence of nitrogen dioxides ($NO_2$).

Disposed further downstream to abate the nitrogen oxides present in the exhaust gases, including the $NO_2$ produced by the DOC 162, the aftertreatment system 160 can include a primary or main selective catalytic reduction (SCR) catalyst 180. The primary SCR catalyst 180 can include a primary SCR substrate 182 made of vanadium, tungsten, copper-zeolite, and/or iron-zeolite and combinations thereof, that may also be of the opened, flow-through configuration such as honeycomb or wire mesh that presents relatively minor obstruction to flow. To introduce the reductant agent or diesel exhaust fluid (DEF) to the exhaust, a primary DEF injector 184 can be disposed in fluid communication with the exhaust conduit 134 upstream of the primary SCR catalyst 182. The primary DEF injector 184 can be an electromechanically operated injector configured to introduce pressurized DEF as a spray into the exhaust stream in a process sometimes referred to as dosing. To adequately mix the DEF with the exhaust gases prior to encountering the primary SCR catalyst 182, baffles 186 may be located between the primary DEF injector 184 and the primary SCR catalyst 180. The DEF itself may be retrained in a refillable DEF tank 188 or reservoir on the machine associated with the internal combustion engine 100. It is desirable to stoichiometrically balance the introduction DEF to the primary SCR catalyst 180 so that sufficient DEF is present for the reaction but so that little or no excess DEF is present to exit the aftertreatment system unreacted, a condition referred to as ammonia slip. In an embodiment, to address excess ammonia, an ammonia oxidation catalyst (AMOX) may be disposed downstream of the primary SCR catalyst 180 to catalyze ammonia ($NH_3$) and oxygen ($O_2$) to nitrogen ($N_2$) and water ($H_2O$).

The selective catalytic reaction conducted by the primary SCR catalyst 180 is dependent upon several variables and factors that frequently change with the operating state of the internal combustion engine 100. These factors include the exhaust temperature and the duration of the reaction before the exhaust gasses exit the SCR catalyst. For example, the SCR reaction may require that the primary SCR catalyst 180 has attained an activation temperature of 200° C. or more, possible 225° C. or more. Because the primary SCR catalyst 180 is located downstream of the other aftertreatment components including the DOC 162 and the DPF 170 and is a spaced distance from the exhaust manifold 132 and the discharge of the turbine 142, the temperature of the exhaust gases may insufficient to rapidly heat the SCR catalyst to operating temperatures, especially during start up conditions or cold start of the internal combustion engine 100. Accordingly, $NO_X$ may be discharged to the atmosphere until the primary SCR catalyst 180 has reached the reaction temperature. In accordance with an aspect of disclosure, to allow the primary SCR catalyst 180 to reach reaction temperature, the aftertreatment system 160 can include a secondary or supplemental SCR catalyst 190 disposed upstream of the other devices including the primary SCR catalyst 180.

In an embodiment, the supplemental SCR catalyst 190 can be disposed in a closed-coupled relation to and immediately upstream of the DOC 162 in a location where the supplemental SCR catalyst 190 receives raw exhaust gasses directly from the turbine 142 via the exhaust conduit 134. As used herein, the term "close-coupled" means the absence of intervening components affecting exhaust composition, namely $NO_x$, unburned hydrocarbons (HC) particulate matter, or other exhaust constituents. "Raw" means untreated, such that stating the supplemental SCR catalyst 190 receives raw exhaust from the internal combustion engine 100 means no aftertreatment processing has occurred. Because the supplemental SCR catalyst 190 receives hot exhaust gases from the internal combustion engine 100, it may rapidly heat to the reaction temperature to quickly reduce $NO_X$ content of the gases.

In another embodiment, the supplemental SCR catalyst 190 may be positioned further upstream of the other components of the aftertreatment system 160, for example, the supplemental SCR catalyst can be located in the exhaust conduit 134 proximate the turbine 142 of the turbocharger 140. By locating the supplemental SCR catalyst 190 further upstream in the exhaust conduit 134, as described in the present embodiment, the supplemental SCR catalyst can receive exhaust gases at sufficiently elevated temperatures to quickly rise to an operational temperature for conducting the SCR process. It will be appreciated that the location of the supplemental SCR catalyst 190 may be dependent upon the size of the internal combustion engine 100 and the length of the exhaust conduit 134 and can be selected so that the supplemental SCR catalyst 190 is exposed to elevated temperatures of the exhaust gases.

The supplemental SCR catalyst 190 can be similar in design and configuration to the primary SCR catalyst 180 and can include a supplemental SCR substrate 192 made of vanadium or tungsten in an opened, flow-through configuration. To receive DEF to initiate the SCR reaction, a supplemental DEF injector 194 can be disposed in the exhaust conduit 134 upstream of the supplemental SCR catalyst 190. In an embodiment, the supplemental DEF injector 194 may be disposed in a section of the exhaust conduit 134 that includes one or more bends or elbows so that DEF and the hot exhaust gases may adequately mix prior to encountering the supplemental SCR catalyst. In an embodiment, the supplement DEF injector 194 may be located in the exhaust conduct 132 in proximity to the turbine 142 so that temperature of the DEF is raised by the hot exhaust gasses prior to reaching the supplemental SCR catalyst 190 and to avoid deposit formation due to turbulence. The supplemental DEF injector 194 may be in fluid communication with the DEF tank 188 to receive DEF; however, in other embodiment, the supplemental DEF injector may be operatively associated with its own DEF tank or reservoir.

To coordinate and regulate operation of the internal combustion engine 100 and its associated systems, an electronic control unit (ECU) 200, also referred to as an engine control module (ECM) or possibly just controller, may be operatively associated with the engine and may be disposed onboard the machine that the engine powers. The ECU 200 can be a programmable computing device and can include one or more microprocessors 202, non-transitory computer readable and/or writeable memory 204 or a similar storage medium, input/output interfaces 206, and other appropriate circuitry for processing computer executable instructions, programs, applications, and data to regulate performance of the engine 100. The ECU 200 may be configured to process digital data in the form of binary bits and bytes. The ECU 200 can communicate with various sensors to receive data about engine performance and operating characteristics and can responsively control various actuators to adjust that performance.

To send and receive electronic signals to input data and output commands, the ECU 200 can be operatively associated with a communication network having a plurality of terminal nodes connected by data links or communication channels. For example, as will be familiar to those of skill in the art of automotive technologies, a controller area network ("CAN") can be utilized that is a standardized communication bus including physical communication channels conducting signals conveying information between the ECU 200 and the sensors and actuators associated with the internal combustion engine 100. However, in possible embodiments, the ECU 200 may utilize other forms of data communication such as radio frequency waves like Wi-Fi, optical wave guides and fiber optics, or other technologies. In an embodiment, the ECU 200 may be a preprogrammed, dedicated device like an application specific integrated circuit (ASIC) or field programmable gate array (FPGA). To possibly interface with an operator or technician, the ECU 200 can be operatively associated with an operator interface display that may also referred to as a human-machine interface (HMI).

To regulate operation of the aftertreatment system 160, the ECU can electronically communicate with sensors, actuators, and regulators as indicated in FIG. 1 by dashed lines. For example, to measure and determine the temperature of hot exhaust gases exiting the turbine 142, a raw exhaust sensor 210 can be disposed in fluid communication with the exhaust conduit 134 extending from the turbine 142 upstream of the aftertreatment system 160. The raw exhaust sensor 210 can therefore measure the temperature and other qualities of the raw exhaust gases prior to any aftertreatment processing. The raw exhaust sensor 210 can be a thermocouple, an infrared sensor, or operate on other suitable temperatures sensing parameters. The raw exhaust sensor 210 may be configured to measure or sense other parameters of the raw exhaust gas, such as volume or mass flow rate in the exhaust conduit 134 or the $NO_X$ content or concentration in the raw exhaust gases. To measure and determine the temperature of the primary SCR catalyst 180, the ECU 200 can be in electronic communication with a primary SCR sensor 212 disposed in or operatively associated with the primary SCR catalyst 180. Likewise, to measure the temperature of the supplemental SCR catalyst 190, the ECU 200 can be in electronic communication with the supplemental SCR sensor 214 disposed in or operatively associated with the supplemental SCR catalyst 190. Like the raw exhaust sensor 210, the primary and supplemental SCR sensors 212, 214 may be configured to measure or sense other parameters and/or properties such as mass flow rate and $NO_X$ concentration at their respective locations. In possible embodiments, the primary and supplement SCR sensors 212, 214 may be virtual sensors that indirectly sense $NO_X$ concentration based on other parameters associated with the exhaust gases or engine operation. The ECU 200 may also be in electronic communication with the primary and supplemental DEF injectors 184, 194 to selectively operate them and possibly to adjust the quantity of DEF introduced to the respective catalyst. The ECU 200 may also control operation of the inlet governor 124 and EGR valve 154 to regulate operation of the air intake system 120 and the EGR system 150 respectively.

Figure 3:
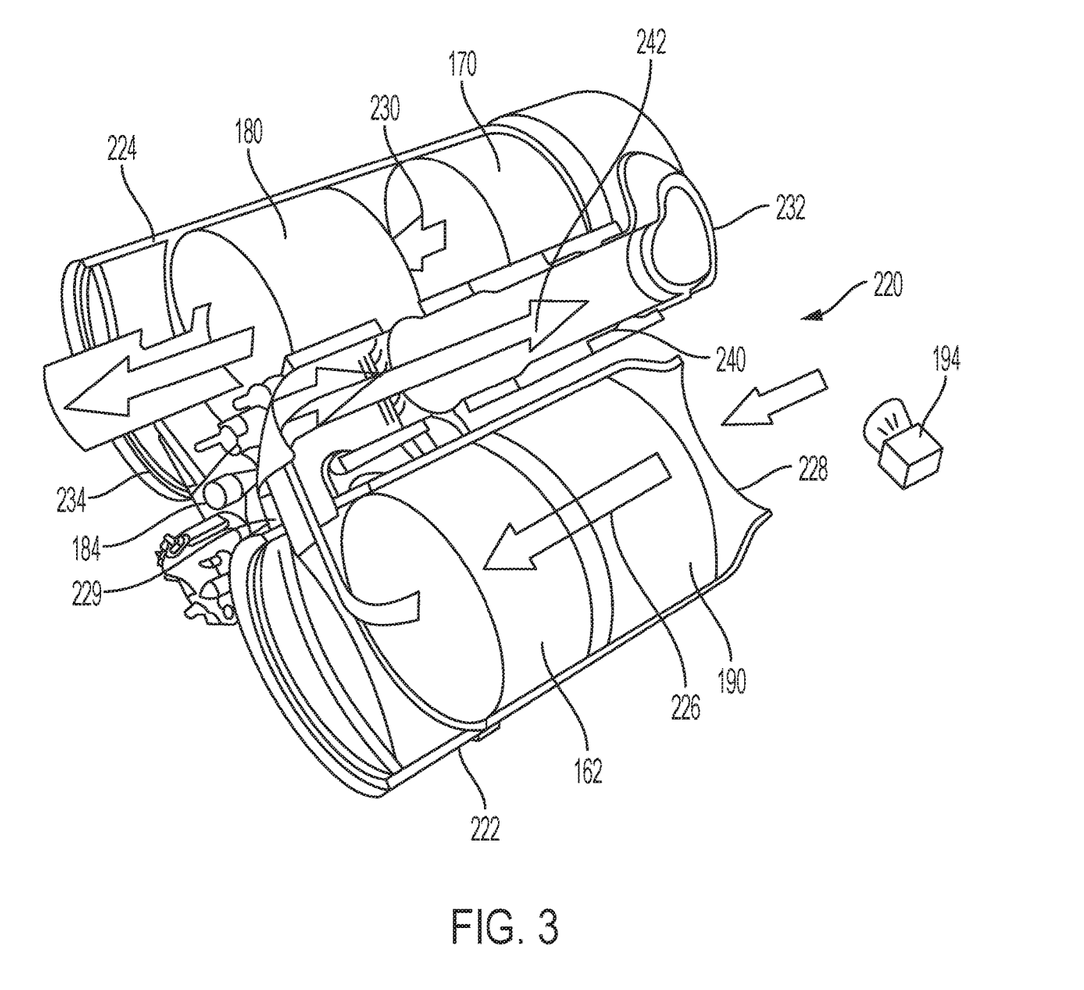
FIG. 3 is a partial sectional view of an exhaust aftertreatment system configured as a compact module in accordance with the disclosure.

In accordance with an aspect of the disclosure, to limit space and weight and to simplify installation and mounting on the internal combustion engine 100, the devices of the aftertreatment system 160 can be arranged and packaged as a compact module 220. Packaging the aftertreatment system 160 as a compact module 220 reduces size and weight while allowing for arrangement of the various devices and routing of the exhaust gases in a manner that increases the cooperative interaction of the system. Referring to FIG. 3, to accommodate the aftertreatment devices, the compact module 220 can include a first or upstream housing 222 and a second or downstream housing 224, which are both generally cylindrical in shape and may be manufactured as metal drums or cans from, for example, stainless steel or aluminum. The cylindrical upstream module housing 222 can define a first axial flow path 226 for flow of exhaust gases between an inlet opening 228 and an exit opening 229 of the upstream module housing 222. The inlet opening 228 into the upstream end of the upstream module housing 222 may be axially aligned with the first axial flow path 226. In an embodiment, the downstream axial end of the upstream module housing 222 may be closed so that the exit opening 229 is directly radially through the housing. Likewise, the cylindrical downstream module housing 224 can define an axial flow path 230 for the exhaust gases between an inlet opening 232 and an exit opening 234 of the downstream module housing 224. The upstream axial end of the downstream module housing 224 can be enclosed so that the inlet opening 232 is disposed radially into the housing while the exit opening 234 may be axially aligned with the axial flow path 230.

When assembled in the compact module 220, the upstream and downstream module housing 222, 224 can be disposed parallel to each other with the first and second axial flow paths 226, 230 likewise parallel and which further may be both oriented in the same axial direction. To establish fluid communication between the upstream module housing 222 and the downstream module housing 224, a transfer pipe or transfer conduit 240 may be disposed there between such that exhaust gasses flow from the exit opening 228 of the upstream module housing 222 to the inlet opening 232 of the downstream module housing 224. The transfer conduit 240 may be a cylindrical, elongated tube that is smaller in diameter than either the upstream module housing 222 or the downstream module housing 224. Because the upstream axial ends of the upstream and downstream module housings 222, 224 may be disposed relatively coextensive to each other, and downstream axial ends of the upstream and downstream module housings 222, 224 may be disposed relatively coextensive to each other, the transfer conduit 240 needs to reverse and redirect the flow of exhaust gasses. In particular, the transfer conduit 240 may establish a third axial flow path 242 parallel to and in the opposite direction of the first and second axial flow paths 226, 230.

In an embodiment, the devices of the aftertreatment system 160 can be arranged in series in the upstream and downstream module housings 222, 224 to advantageously stage the different reactions with the exhaust gases. For example, the supplemental SCR catalyst 190 can be disposed in the upstream module housing 222 adjacent the inlet opening 228 to receive raw exhaust gases. For accommodation in the cylindrical upstream module housing 222, the supplemental SCR substrate associated with supplemental SCR catalyst 190 can be formed as a cylindrical substrate brick with the substrate matrix, such as a honeycomb or wire mesh, disposed in a tubular shell that can be secured adjacent the inner wall of the upstream module housing 222. Accordingly, the supplemental SCR catalyst 190 and the cylindrical upstream module housing 222 can have complementary diameters. The supplemental DEF injector 194 can be disposed upstream of the inlet opening 228 to provide DEF to the supplemental SCR catalyst 190, but in other embodiments, the supplemental DEF injector 194 can be disposed inside the inlet opening 228. The DOC 162 can be disposed in series immediately downstream of, and axially aligned with, the supplemental SCR catalyst 190 and can be proximate to the exit opening 229 of the upstream module housing 222. The DOC 162 can also be formed as a cylindrical brick with a diameter complementary to the upstream module housing 222. In a possible embodiment, an ammonia oxidation catalyst (AMOX) may be included between the supplemental SCR catalyst 190 and the DOC 162 in the upstream module housing 222.

The exhaust gases exiting the exit opening 229 of the upstream module housing 222 are redirected by the transfer conduit 240 approximately 180° along the third axial flow path 242. In an embodiment, to provide DEF for the primary SCR catalyst 180, the primary DEF injector 184 can be in fluid communication with the transfer conduit 240 proximate where the transfer conduit 240 joins the exit opening 229 of the upstream module housing 222. The DEF will have sufficient opportunity to mix with the exhaust gases as they traverse the length of the transfer conduit 240 to the inlet opening 232 of the downstream module housing 224. In addition, disposing the primary DEF injector 184 in the transfer conduit 240 and introducing the DEF downstream of the DOC ensure the DEF will not prematurely react with the DOC 162, which may be catalyzed with precious or reactive metals.

The exhaust gases are redirect again 180° from the third axial flow path 242 to the second axial flow path 230 and enter the DPF 170 disposed inside the second module housing 224 adjacent the inlet opening 232 for removal of particulate matter. The DPF 170 can be axially aligned along the second axial flow path 230 with the primary SCR 180 disposed downstream in the downstream module housing 224. The primary SCR 180 reduces the $NO_X$ in the exhaust gases, that are then axially discharged from the downstream module housing 224 through exit opening 234. Both the DPF 170 and the primary SCR 180 can be formed as cylindrical bricks for accommodation in the cylindrical downstream module housing 224.

Figure 4:
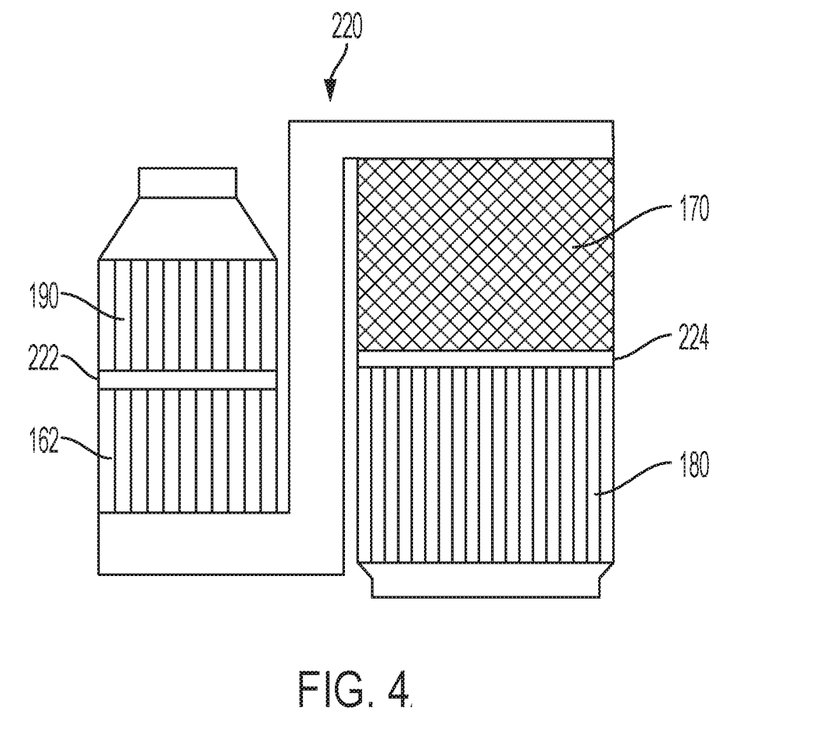
FIG. 4 is a schematic representation of the relative size differences of aftertreatment devices accommodated in a compact module as taken through the mid-plane of the compact module in FIG. 3
Figure 5:
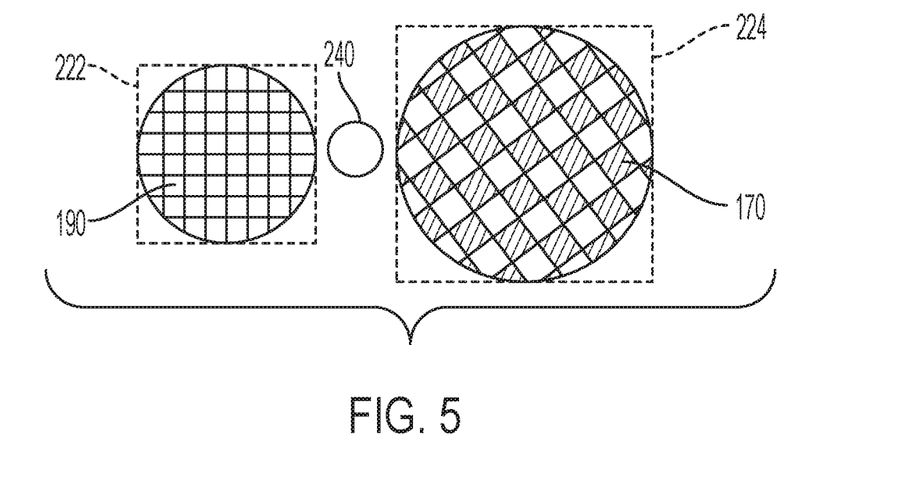
FIG. 5 is another schematic representation of the relative size differences of the aftertreatment devices accommodated in the compact module as viewed into the compact module.

The foregoing arrangement allows for smaller packaging of the aftertreatment system 160 that reduces overall size and weight of the system. For example, because the DPF 170 is typically a wall-flow device requiring exhaust gases to traverse internal walls, the DPF 170 is typically sufficiently sized to have significant surface area and reduce the backpressure otherwise created. The primary SCR catalyst 180 is also sufficiently sized with significant surface area to prolong the SCR reaction time and substantially reduce $NO_X$ while preventing ammonia slip. The supplemental SCR catalyst 190 and the DOC 162, in contrast, can tend to be smaller in size and/or volume than the primary SCR catalyst 180 and DPF 170. Referring to FIG. 4, the relative sizing of the aftertreatment devices allows for overall reduction in size of the compact module 220. As can be seen in FIG. 4, the axial length of the upstream module housing 222 can be shorter than the corresponding axial length of the downstream module housing 224. Likewise, as can be seen in FIG. 5, the comparatively smaller supplemental SCR catalyst 180 and DOC 162 allow for the upstream module housing 222 to have a smaller diameter than compared to the downstream module housing 224 and can be sized to produce $NO_X$ reduction only during the startup conditions. Hence, the overall size and volume of a compact module 220 according to the foregoing design can be substantially less than a conventional system in which each of the aftertreatment devices has the substantially the same size and shape.

INDUSTRIAL APPLICABILITY

Figure 6:
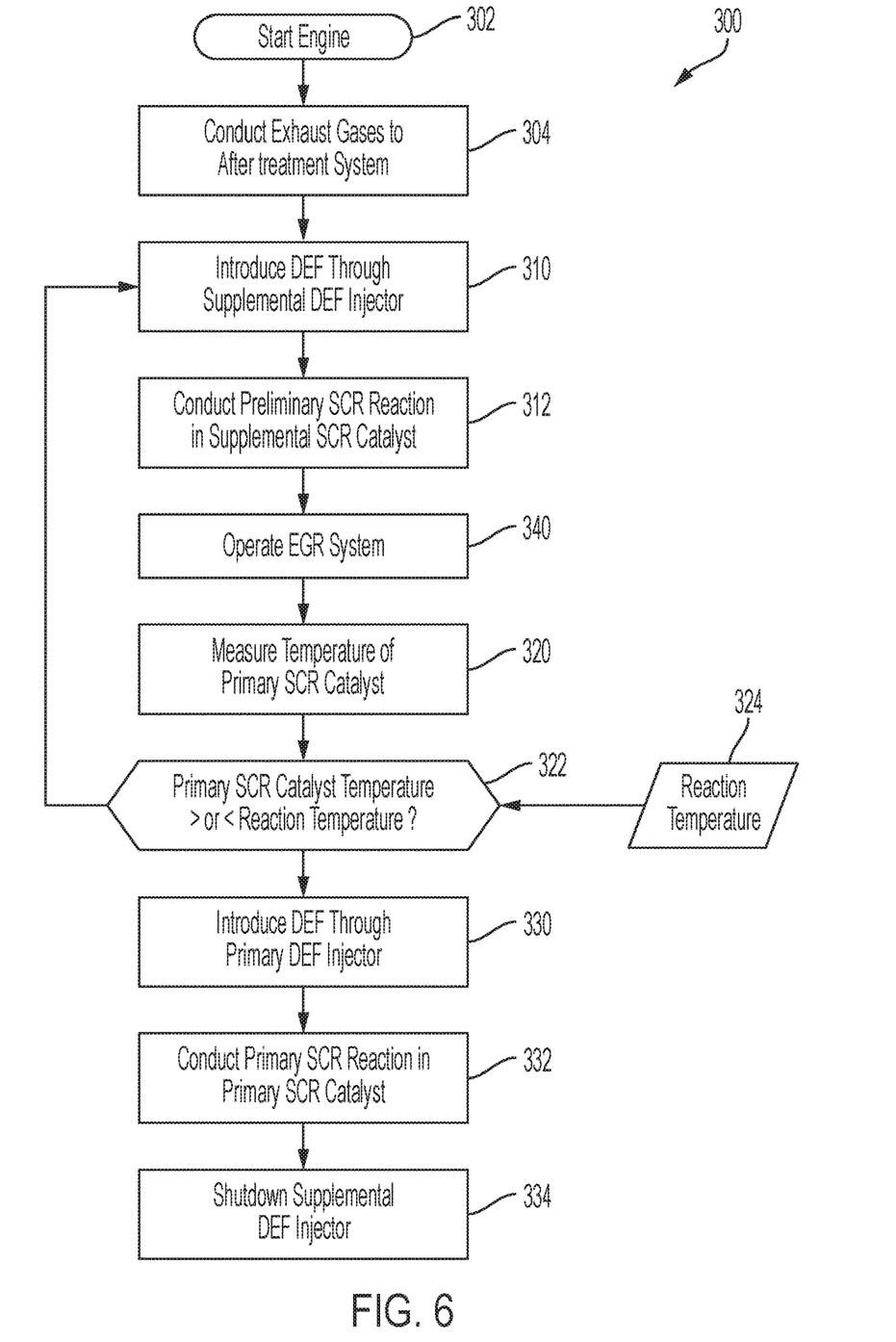
FIG. 6 is a flow diagram illustrating an example of a computer implemented methodology or process for treating exhaust gases from an internal combustion engine in accordance with the disclosure.

Referring to FIG. 6, there is illustrated a flow diagram 300 of an exemplary routine or algorithm for the disclosed aftertreatment process. The flow diagram 300 can include a series of steps, including actions and decisions, that can be implemented as computer-executable software instructions or code in the form of an application or program that can be executed by the processor 202 associated with the ECU 200. Further, the flow diagram 300 in software form may be stored in a non-transitory state in the memory 204 associated with the ECU 200. The flow diagram 300 may begin by initially starting the internal combustion engine 100 in a start step 302, which may include cold starting and/or staring in a cold ambient environment.

In a conduction step 304, raw exhaust gases are conducted from the internal combustion engine 100 to the aftertreatment system 160, which may be arranged in the compact module 220 of FIG. 3. In a first DEF introduction step 310, the ECU 200 may direct that the supplemental DEF injector 194 introduce DEF into the raw exhaust gases upstream of the compact module 220. Accordingly, as the mixture enters the supplemental SCR catalyst 190, a preliminary SCR reaction step 312 may occur in which the $NO_X$ in the raw exhaust gases is reduced to $N_2$ and $H_2O$. This may be in part because the supplemental SCR catalyst 190, due to its upstream location receiving hot, untreated raw exhaust gases and its relatively small size and volume, may quickly heat to reaction temperature in a relatively short time. By way of example, the supplemental SCR catalyst 190 may heat to a reaction temperature of about 200° C. to 225° C. in approximately 30 seconds. During the startup mode or other cold start conditions, the primary SCR injector 1484 is not introducing DEF so that the primary SCR catalyst cannot react with exhaust gases.

It may be desirable to run the preliminary SCR reaction for a limited time. Accordingly, the ECU 200 may monitor the temperature of the primary SCR catalyst 180 in a temperature measurement step 320 using, for example, the primary SCR sensor 210. The ECU 200 can use the temperature of the primary SCR catalyst 180 to execute a decision step 322 in which the ECU 200 compares the catalyst temperature with an reaction temperature 324, for example, about 200° C. to 225° C. If the primary SCR catalyst 180 remains below the reaction temperature 324, the ECU 200 may return to the first DEF introduction step 310 to continue introducing DEF through the supplemental DEF injector 194.

If, however, the decision step 322 determines the primary SCR catalyst 180 is at or exceeds the reaction temperature 324, the aftertreatment system 160 may be considered to have entered a running mode. By way of example, the primary SCR catalyst 180 may require 300 seconds or more to reach the reaction temperature 324 and enter the running mode. At that time, the ECU 220 can execute a second DEF introduction step 330 to direct that the primary SCR injector 184 begin introducing DEF to the exhaust gasses upstream of the primary SCR catalyst 180 and the DOC 162. In the embodiment of a compact module 220, for example, the DEF can be introduced to the transfer conduit 240 upstream of the DPF 170 in the downstream module housing 224. The second DEF introduction step 330 results in a primary SCR reaction step 332 in which the primary SCR catalyst 180 reduces $NO_X$ to $N_2$ and $H_2O$. Since the primary SCR catalyst 180 is operational, the ECU 220 in a shutdown step 334 can direct the supplemental DEF injector 194 to stop introducing DEF such that the preliminary SCR reaction in the supplemental SCR catalyst 190 ceases.

A possible advantage of the foregoing arrangement of the aftertreatment system 160 is that $NO_X$ production during the startup mode or from cold staring the internal combustion engine 100 is substantially reduced. In a possible variation, during startup mode, the ECU 220 may conduct an EGR step 340 in which the EGR valve 154 is opened to recirculate exhaust gases to the intake system 120 while the preliminary SCR reaction occurs, further reducing $NO_X$ production during the combustion cycle. In another possible variation, the primary SCR sensor 212 may continue monitoring the temperature of the primary SCR catalyst 180 so that if it fall below the reaction temperature 324, for example during engine idle in extreme cold weather conditions, the aftertreatment system can switch back to using the supplemental SCR catalyst 190 to reduce $NO_X$. Operating the supplemental SCR catalyst 190 instead of the primary SCR catalyst 180 during such extreme cold conditions also reduces ammonia slip.

Another possible advantage of the foregoing arrangement is that the DPF 170, which can be a bare, uncoated DPF, can be passively regenerated. During operation, the DOC 162 creates $NO_2$ from NO and $O_2$ in the exhaust gases. The $NO_2$ is transferred to the bare DPF 170 via the transfer conduit 240 to participate in passively regenerating the DPF 170. In addition, the bare DPF 170 being free of catalysts will not react with the DEF introduced by the primary DEF injector 184 upstream so that the DEF will not be degraded or rendered inactive. These and other possible advantages and features of the disclosure should be apparent from the foregoing description and accompanying drawings.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An aftertreatment system comprising:
a diesel oxidation catalyst (DOC) receiving exhaust gases and operatively configured to oxidize carbon monoxide (CO) and hydrocarbons ($C_xH_x$) in the exhaust gases to carbon dioxide ($CO_2$) and water ($H_2O$);
a diesel particulate filter (DPF) disposed downstream of the DOC to receive exhaust gases and operatively configured to trap particulate matter from the exhaust gases;
a primary selective catalytic reduction (SCR) catalyst disposed downstream of the DPF, the primary SCR catalyst operatively configured to reduce nitrogen oxides ($NO_X$) to nitrogen ($N_2$) and water ($H_2O$) during a running mode of the aftertreatment system; and
a supplemental SCR catalyst disposed upstream of and close-coupled to the DOC to receive raw exhaust gases, the supplemental SCR catalyst operatively configured to reduce nitrogen oxides ($NO_X$) to nitrogen ($N_2$) and water ($H_2O$) during a startup mode of the aftertreatment system, wherein the DPF is an un-catalyzed bare DPF configured for passive regeneration in the presence of nitrogen dioxide ($NO_2$) oxidized in part by the DOC.

2. The aftertreatment system of claim 1, wherein the supplemental SCR catalyst and the DOC are closed-coupled and adjacent each other.

3. The aftertreatment system of claim 2, further comprising:
a supplemental diesel exhaust fluid (DEF) injector disposed upstream of the supplemental SCR catalyst; and
a primary DEF injector disposed between the DOC and the DPF.

4. The aftertreatment system of claim 1 wherein the DPF has a wall-flow configuration directing exhaust gases through a plurality of internal channel walls.

5. The aftertreatment system of claim 4, wherein the DOC, the primary SCR catalyst, and the supplemental SCR catalyst have a flow-through configuration including a plurality of open channels.

6. The aftertreatment system of claim 5, further comprising a primary SCR sensor operatively associated with the primary SCR catalyst and configure to monitor temperature of the primary SCR catalyst.

7. The aftertreatment system of claim 6, wherein the primary SCR sensor electrically communicates with an electronic control module (ECU) configured to direct the primary SCR injector to introduce DEF upon the primary SCR catalyst reaching a reaction temperature.

8. The aftertreatment system of claim 7, wherein the ECU is configured to direct the supplemental SCR catalyst to cease introducing DEF upon the primary SCR catalyst reaching the reaction temperature.

9. The aftertreatment system of claim 3, wherein the supplemental DEF injector and the primary DEF injector are both in fluid communication with a DEF reservoir.

10. A method of treating exhaust gases from an internal combustion engine comprising:
receiving raw exhaust gases at a supplemental selective catalytic reduction (SCR) catalyst and reacting the raw exhaust gases with diesel exhaust fluid (DEF) to reduce nitrogen oxides ($NO_X$) to nitrogen ($N_2$) and water ($H_2O$) during a startup mode of the internal combustion engine;
directing the exhaust gases from the supplemental SCR catalyst to a diesel oxidation catalyst (DOC) and to a diesel particulate filter (DPF) downstream of the supplemental SCR catalyst, wherein the DPF is an un-catalyzed bare DPF configured for passive regeneration in the presence of nitrogen dioxide ($NO_2$) oxidized in part by the DOC; and
receiving the exhaust gases from the DOC and DPF at a primary SCR catalyst and reacting the exhaust gases with DEF to reduce $NO_X$ to $N_2$ and $H_2O$ during a running mode of the internal combustion engine.

11. The method of claim 10, further comprising:
measuring a temperature of the primary SCR catalyst and comparing with a reaction temperature; and
introducing DEF to the exhaust gases received by the primary SCR catalyst when the temperature of the primary SCR catalyst reaching or exceeding the reaction temperature.

12. The method of claim 11, further comprising ceasing introducing DEF to the raw exhaust gases received at the supplemental SCR catalyst when the temperature of the primary SCR catalyst reaches or exceeds the reaction temperature.

13. The method of claim 10, wherein the DEF includes a wall-flow configuration.

14. The method of claim 13, further comprising passively regenerating the bare DPF in the presence of nitrogen dioxide ($NO_2$) oxidized in part by the DOC.

15. A compact module for after treatment of exhaust gases from an internal combustion engine, the compact module comprising:
an upstream module housing accommodating a supplemental selective catalytic reduction (SCR) catalyst and a diesel oxidation catalyst DOC in a close-coupled relation, the supplemental SCR catalyst proximate an inlet opening of the upstream module housing to receive raw exhaust gases and the DOC downstream the supplemental SCR catalyst;
a downstream module housing accommodating a diesel particulate filter (DPF) and a primary SCR catalyst, the DPF proximate an inlet opening of the downstream module housing and the primary SCR catalyst downstream the DPF;
a transfer conduit establishing fluid communication between the upstream module housing and the downstream module housing; and
a primary diesel exhaust fluid (DEF) injector in fluid communication to introduce DEF to exhaust gases directed from the upstream module housing to the downstream module housing.

16. The compact module of claim 15, wherein the supplemental SCR catalyst has a smaller volume than the primary SCR catalyst.

17. The compact module of claim 16, further comprising a primary SCR sensor operatively associated with the primary SCR catalyst and configure to monitor temperature of the primary SCR catalyst.

18. The compact module of claim 17, wherein the primary SCR sensor electrically communicates with an electronic control module (ECU) configured to direct the primary SCR injector to introduce DEF upon the primary SCR catalyst reaching a reaction temperature.

19. The compact module of claim 15, wherein the DPF is a bare DPF with an un-catalyzed wall-flow configuration configured for passive regeneration in the presence of nitrogen dioxide ($NO_2$) oxidized in part by the DOC.

20. The compact module of claim 15, wherein the upstream module defines a first axial flow path and the downstream module defines a second axial flow path, the first and second axial flow paths being parallel to each other and oriented in the same direction, wherein exhaust gases flowing through the transfer conduit is parallel to and opposite in direction relative to the first and second axial flow paths.

* * * * *